United States Patent
Pu et al.

(10) Patent No.: US 10,978,776 B2
(45) Date of Patent: Apr. 13, 2021

(54) DIELECTRIC RESONATOR AND DIELECTRIC FILTER, TRANSCEIVER, AND BASE STATION TO WHICH DIELECTRIC RESONATOR IS APPLIED

(71) Applicant: HUAWEI TECHNOLOGIES CO., LTD., Guangdong (CN)

(72) Inventors: Guosheng Pu, Yokohama (JP); Jing Shi, Shanghai (CN); Masaru Ichikawa, Yokohama (JP); Zhen Shen, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 47 days.

(21) Appl. No.: 16/170,828

(22) Filed: Oct. 25, 2018

(65) Prior Publication Data

US 2019/0067789 A1 Feb. 28, 2019

Related U.S. Application Data

(63) Continuation of application No. PCT/CN2016/080245, filed on Apr. 26, 2016.

(51) Int. Cl.
*H01P 1/20* (2006.01)
*H01P 7/10* (2006.01)
(Continued)

(52) U.S. Cl.
CPC ............ *H01P 7/105* (2013.01); *H01P 1/20* (2013.01); *H01P 1/2086* (2013.01); *H04W 88/02* (2013.01); *H04W 88/08* (2013.01)

(58) Field of Classification Search
CPC .... H01P 7/10; H01P 7/105; H01P 1/20; H01P 1/2084; H01P 1/2086
(Continued)

(56) References Cited

U.S. PATENT DOCUMENTS

| 4,652,843 A | 3/1987 | Tang et al. |
| 6,002,311 A | 12/1999 | Wey et al. |

(Continued)

FOREIGN PATENT DOCUMENTS

| CN | 102790250 A | 11/2012 |
| CN | 103972621 A | 8/2014 |

(Continued)

OTHER PUBLICATIONS

Hattori, Jun et al. "2GHz Band Triple Mode Dielectric Resonator Duplexer for Digital Cellular Base Station" 2000 Asia-Pacific Microwave Conference. New Jersey, USA, Dec. 3, 2000. XP010545143, total 4 pages.

(Continued)

*Primary Examiner* — Stephen E. Jones
(74) *Attorney, Agent, or Firm* — Womble Bond Dickinson (US) LLP

(57) ABSTRACT

This application relates to components of communications devices, and in particular, to a dielectric resonator and a dielectric filter, a transceiver, and a base station to which the dielectric resonator is applied. Embodiments of this application provide a dielectric resonator and a dielectric filter, a transceiver, and a base station to which the dielectric resonator is applied. The dielectric resonator includes a metal cavity and a dielectric block that is disposed in the metal cavity and that is made from a solid-state dielectric material; where sizes of the dielectric block meet c<b<a, where a, b, and c are respectively the sizes of the dielectric block in three dimensions in a three-dimensional coordinate system; a hole is disposed on the dielectric block; and a surface of the dielectric block is not metalized and is not in contact with the metal cavity.

9 Claims, 9 Drawing Sheets

(51) Int. Cl.
  *H01P 1/208* (2006.01)
  *H04W 88/02* (2009.01)
  *H04W 88/08* (2009.01)

(58) Field of Classification Search
  USPC .................................................... 333/219.1
  See application file for complete search history.

(56) References Cited

U.S. PATENT DOCUMENTS

| | | | | |
|---|---|---|---|---|
| 6,529,094 | B1* | 3/2003 | Kubo | H01P 1/2084 333/134 |
| 6,903,627 | B2* | 6/2005 | Wakamatsu | H01P 1/2053 333/134 |
| 8,830,014 | B2* | 9/2014 | Surinder | H01P 1/2084 333/202 |
| 2003/0137368 | A1* | 7/2003 | Saito | H01P 7/105 333/202 |
| 2012/0293280 | A1 | 11/2012 | Chun et al. | |

FOREIGN PATENT DOCUMENTS

| | | |
|---|---|---|
| CN | 204088531 U | 1/2015 |
| CN | 204668441 U | 9/2015 |
| CN | 204885383 U | 12/2015 |
| CN | 105390780 A | 3/2016 |
| EP | 1014473 A1 | 6/2000 |
| EP | 1091441 A2 | 4/2001 |
| JP | 2000077916 A | 3/2000 |
| JP | 2003110303 A | 4/2003 |
| JP | 2005-065040 A | 3/2005 |
| KR | 101320896 B1 | 10/2013 |

OTHER PUBLICATIONS

Extended European Search Report dated Mar. 14, 2019 in corresponding European Patent Application No. 16899751.8 (7 pages).
Liu Hai-wen et al.,"Research Progress of Planar Multi-mode Bandpass Filter", Space Electronic Technology,dated Feb. 16, 201,total 7 pages.
Xiaowu Zhan,"The Design of Planar Multiband Bandpass Filters Based on the Multi-mode Resonators",dated Jun. 13, 2013,Electromagnetic and microwave technology,total 87 pages.
Yanfen,Zhai,"Design and research of multimode filters",University of Electronic Science and Technology of China, Radio Physics,dated Apr. 2009,total 75 pages.
Ke-Li Wu et al.,"A TM11 Dual-Mode Dielectric Resonator Filter With Planar Coupling Configuration",IEEE Transactions pri Microwave Theory and Techniques (vol. 61 , Issue: 1 , Jan. 2013 ),total 8 pages.
Mohammad Memarian et al.,"Quad-Mode and Dual-Mode Dielectric Resonator Filters",IEEE Transactions on Microwave Theory and Techniques (vol. 57 , Issue: 12 , Dec. 2009 ),total 11 pages.
Long Guo,"Research and Design of Microstrip Dual Band and Multimode Filters",University of Electronic Science and Technology of China, Radio Physics, 2011,total 69 pages.
Lu Zhang,"Research and Design of Ultra-wide Band Multiple-mode Filters",Nanjing University of Aeronautics and Astronautics the Graduate School College of Information Science and Technology, 2010,total 71 pages.
Wei Fu,"Research on Novel Planar Dual-mode and Multimode Bandpass Filter",East China Jiaotong University, Communication and Information System,2012,total 63 pages.
Shaoguo Mo,"Design and Research of Microwave Planar Dual Mode and Multimode Filters",University of Electronic Science and Technology of China, Radio Physics, 2010,total 83 pages.
Yi-Chyun Chiou et al.,"Planar multimode resonator bandpass filters with sharp transition and wide stopband",2008 IEEE MTT-S International Microwave Symposium Digest,total 4 pages.
K. Ma et al.,"A Compact Multimode Bandpass Filter With Extended Stopband Bandwidth", Progress in Electromagnetics Research Letters, vol. 32, 2012,total 11 pages.
Y.-C. Chiou et al.,"Planar Multiband Bandpass Filter With Multimode Stepped-Impedance Resonators",Progress in Electromagnetics Research, vol. 114, 129-144, 2011.
S.J. Fiedziuszko,"Dual-Mode Dielectric Resonator Loaded Cavity Filters",IEEE Transactions on Microwave Theory and Techniques (vol. 30 , Issue: 9 , Sep. 1982 ),total 6 pages.
Smain Amari et al.,"New Dual-Mode Dielectric Resonator Filters",IEEE Microwave and Wireless Components Letters, vol. 15, No. 3, Mar. 2005,total 3 pages.
Michael Hoft,"Hybrid TE/TM-Multi-Mode Resonators",2009 German Microwave Conference,total 4 pages.
Jae-Yoon Myung et al.,"Resonant Characteristics of Triple-Mode Dielectric Resonators",Journal of Electromagnetic Engineering and Science, vol. 14, No. 1, 9 14, Mar. 2014,total 6 pages.
International Search Report, dated Feb. 7, 2017, in International Application No. PCT/CN2016/080245 (4 pp.).

\* cited by examiner

Dielectric block

Metal cavity

DIELECTRIC RESONATOR AND DIELECTRIC FILTER, TRANSCEIVER, AND BASE STATION TO WHICH DIELECTRIC RESONATOR IS APPLIED

CROSS-REFERENCE TO RELATED APPLICATIONS

This application is a continuation of International Application No. PCT/CN2016/080245, filed on Apr. 26, 2016, the disclosure of which is hereby incorporated by reference in its entirety.

TECHNICAL FIELD

This application relates to components of communications devices, and in particular, to a dielectric resonator and a dielectric filter, a transceiver, and a base station to which the dielectric resonator is applied.

BACKGROUND

With development of wireless communications technologies and proposal of a concept of a green base station for reducing environmental pollution, a miniaturization requirement of a radio frequency module is increasing. As an important component of the radio frequency module, a filter has an important function in a field of high performance and miniaturization. When a device indicator is met, miniaturization is a typical requirement of a filter of a wireless base station. There are many types and forms of filters. A dielectric multimode filter attracts increasing attention with features, such as miniaturization and high performance.

Conventional forms of a dielectric filter include dielectric single-mode, dielectric dual-mode, and dielectric triple-mode. A conventional single-mode dielectric filter usually needs to meet a performance (insertion loss, outband suppression, echo loss, and the like) requirement of a device in a manner of cascading a plurality of filters, and a relatively large size is required. A multimode dielectric filter includes a multimode dielectric resonator, and one dielectric resonator generates two or more resonance modes by using a multimode feature of the dielectric resonator. Therefore, one multimode resonance cavity can replace two or more conventional single-mode resonance cavities. Compared with a conventional single-mode dielectric filter, the multimode dielectric resonator reduces a filter size and costs. However, a thickness of a conventional multimode dielectric resonator is difficult to reduce, and this greatly limits application of the dielectric filter in a flattened and miniaturized scenario. For example, FIG. 1 shows an existing multimode dielectric resonator. The multimode dielectric resonator forms a plurality of resonance modes in three orthogonal directions in a three-dimensional coordinate system by using a dielectric block (in the figure, $\varepsilon_R$ is a dielectric constant of the dielectric block) of a cubic structure. Reducing a size in one direction definitely causes one mode frequency to deviate from another mode frequency. Consequently, resonance cannot be implemented in a same passband, and the multimode dielectric filter is difficult to implement.

Therefore, a multimode resonator is required, so as to be applied to the flattened and miniaturized scenario and meet a requirement of flattening and miniaturizing a wireless base station.

SUMMARY

Embodiments of this application provide a dielectric resonator and a dielectric filter, a transceiver, and a base station to which the dielectric resonator is applied, so as to meet a requirement of flattening and miniaturizing an existing dielectric filter and wireless base station.

According to a first aspect, an embodiment of this application provides a dielectric resonator, including a metal cavity and a dielectric block that is disposed in the metal cavity and that is made from a solid-state dielectric material; where sizes of the dielectric block meet $c<b<a$, where a, b, and c are respectively the sizes of the dielectric block in three dimensions in a three-dimensional coordinate system; a hole is disposed on the dielectric block; and a surface of the dielectric block is not metalized and is not in contact with the metal cavity. The sizes of the dielectric block meet $c<b<a$. For example, a height of the dielectric block is less than a length and a width of the dielectric block, and the width of the dielectric block is less than the length. Therefore, the dielectric resonator is flattened. A plurality of working resonance modes are constructed by drilling a hole on the dielectric block, an electric field in the working resonance mode rotates around a small hole used as a center, and electric fields of all working resonance modes form one or more closed loops in an XY plane of the three-dimensional coordinate system, so as to implement a flattened multimode dielectric resonator and generate a plurality of working resonance modes with close frequencies on a same dielectric block, so that a filter passband is formed by using these resonance frequencies. Compared with a conventional single-mode dielectric resonator, a quantity of resonators and an occupied size are reduced, and compared with a conventional multimode dielectric resonator, a thickness of the resonator is reduced. The surface of the dielectric block is not metalized and is not in contact with the metal cavity, so that a good quality factor (Q value) of the resonance mode is maintained, so as to facilitate implementing a high-performance filter. In addition, because magnetic fields in different modes of the dielectric resonator are in a same direction, greater convenience is provided to perform single-sided debugging on the dielectric resonator. It should be noted that directions of the X axis, the Y axis, and the Z axis and a corresponding XY plane in the three-dimensional coordinate system in this application may be changed based on a specific device or system requirement. This is not limited in this application. For example, when both the X axis and the Y axis are parallel to a horizontal plane, the XY plane is parallel to the horizontal plane; or when the X axis is parallel to the horizontal plane and the Y axis is perpendicular to the horizontal plane, the XY plane is parallel to both the X axis and the Y axis and is perpendicular to the horizontal plane.

With reference to the first aspect, in a first possible implementation, a quantity of holes is greater than or equal to one. One or more holes are drilled on the dielectric block, and a distance between the holes, a size of the hole, a shape of the hole, and the like are adjusted, so as to construct a plurality of working resonance modes in which frequencies are close and electric fields are distributed in a same plane (for example, the XY plane) and further form a filter passband by using these resonance frequencies.

With reference to the first aspect or the first possible implementation of the first aspect, in a second possible implementation, the hole is a through hole or a blind hole.

With reference to the first aspect, or the first or the second possible implementation of the first aspect, in a third possible implementation, a chamfer and/or an opening groove are or is further disposed on the dielectric block. The opening groove and/or the chamfer are or is disposed on some locations of the dielectric block, so that a bandwidth of coupling between working resonance modes can be flexibly controlled in small space. The bandwidth of coupling represents strength of coupling between resonance modes.

According to a second aspect, an embodiment of this application provides a dielectric resonator, including a metal cavity and a dielectric block that is disposed in the metal cavity and that is made from a solid-state dielectric material; where electric fields in all working resonance modes of the dielectric resonator form one or more closed loops in an XY plane of a three-dimensional coordinate system, and magnetic fields in all the working resonance modes are perpendicular to the XY plane, so as to form a flattened dielectric resonator.

With reference to the second aspect, in a first possible implementation, a resonance frequency of the dielectric resonator in a working resonance mode corresponding to two or more electric field closed loops formed in the XY plane and a resonance frequency in a working resonance mode corresponding to one electric field closed loop formed in the plane are in a same passband range.

With reference to the second aspect or the first possible implementation of the second aspect, in a second possible implementation, a hole may be disposed on the dielectric block in the dielectric resonator, so as to construct a plurality of working resonance modes in which resonance frequencies are in the same passband range.

With reference to the second aspect, or the first or the second possible implementation of the second aspect, in a third possible implementation, a quantity of holes is greater than or equal to one.

With reference to any one of the second aspect, or the first to the third possible implementations of the second aspect, in a fourth possible implementation, the hole is a through hole or a blind hole.

With reference to any one of the second aspect, or the first to the fourth possible implementations of the second aspect, in a fifth possible implementation, a chamfer and/or an opening groove may be disposed on the dielectric block, so as to adjust a bandwidth of coupling between the working resonance modes of the dielectric resonator.

According to a third aspect, an embodiment of this application provides a dielectric filter, including the dielectric resonator according to any one of the foregoing two aspects or possible implementations of the foregoing two aspects. The dielectric filter may include one dielectric resonator. Compared with a filter formed by cascading single-mode dielectric resonators, a miniaturization gain is obtained, and compared with a filter including a conventional multimode dielectric resonator, a flattening gain is obtained. In addition, the dielectric filter is more applicable to a scenario of flattening a filter or a base station. The dielectric filter may also include two or more dielectric resonators, and compared with a filter including a conventional multimode resonator, a flattening gain is obtained. In addition, the dielectric filter is more applicable to a scenario of flattening a filter or a base station.

According to a fourth aspect, an embodiment of this application provides a transceiver, including the dielectric filter according to the third aspect.

According to a fifth aspect, an embodiment of this application provides a base station, including the transceiver according to the fourth aspect.

It should be noted that the dielectric resonator and the dielectric filter provided in the embodiments of this application may be further applied to another apparatus or scenario in which the dielectric resonator and/or the dielectric filter need or needs to be used.

Compared with the prior art, in the dielectric resonator provided in the embodiments of this application, a size in one dimension may be reduced, and a multimode feature is maintained, so as to implement a flattened multimode dielectric resonator, so that the dielectric filter, the transceiver, and the base station to which the dielectric resonator is applied can be flattened and miniaturized to meet a requirement of flattening and miniaturizing the wireless base station.

BRIEF DESCRIPTION OF DRAWINGS

To describe the technical solutions in the embodiments of the present invention or in the prior art more clearly, the following briefly describes the accompanying drawings required for describing the embodiments or the prior art.

Figure 1:
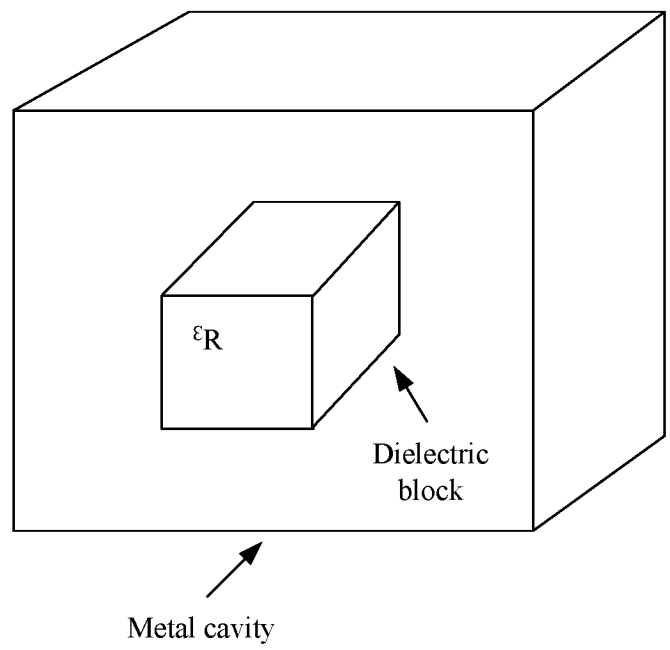
FIG. 1 is a three-dimensional schematic diagram of a multimode dielectric resonator in the prior art related to this application.
Figure 2:
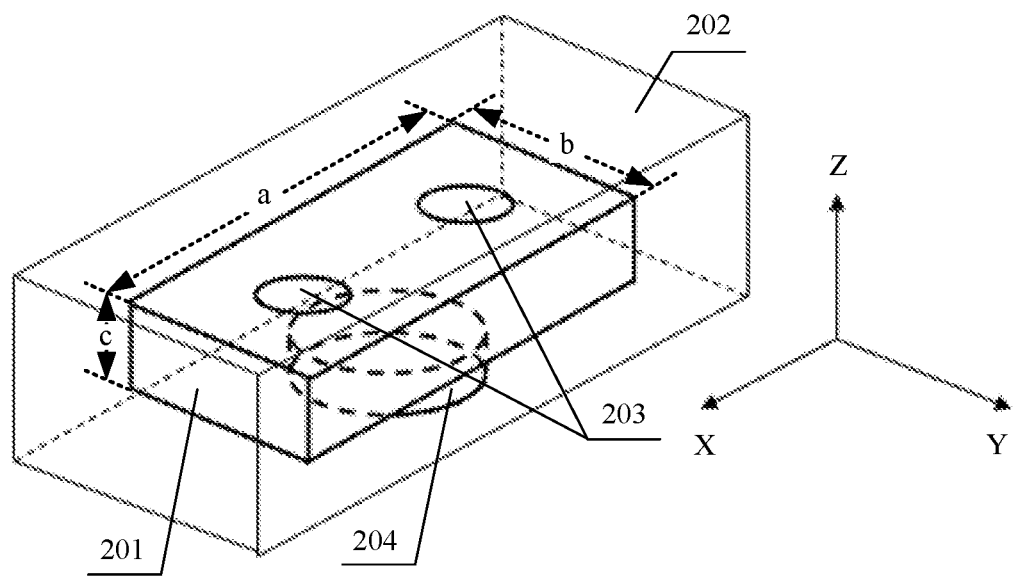
FIG. 2 is a three-dimensional perspective view of a dielectric resonator according to an embodiment of this application.
Figure 2A:
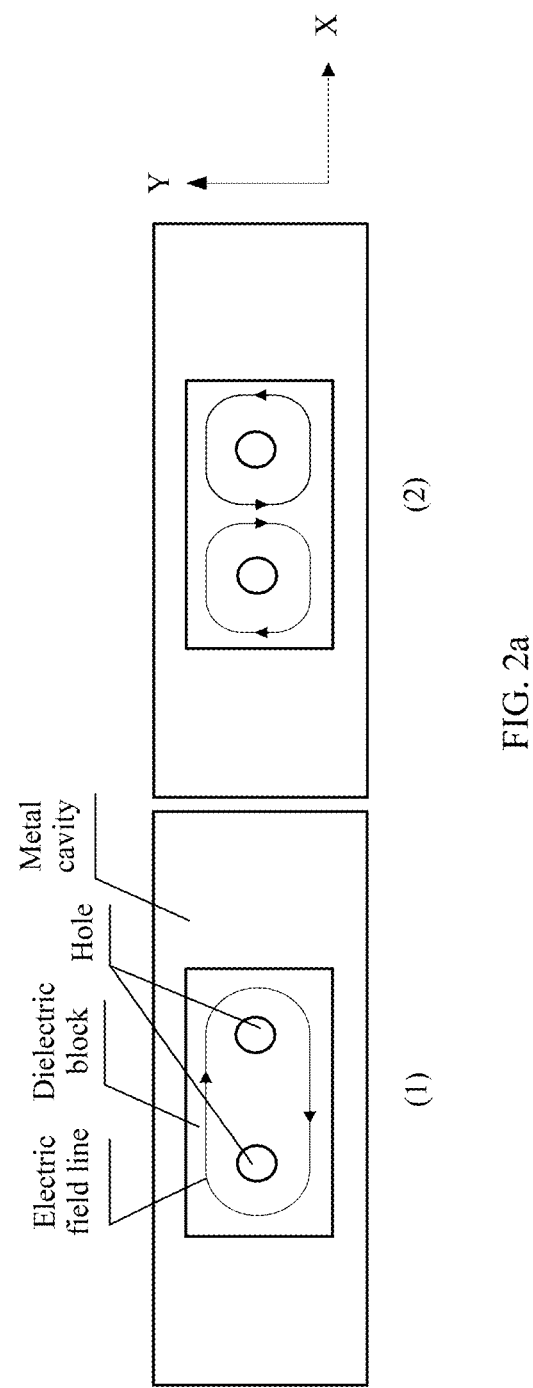
Figure 2B:
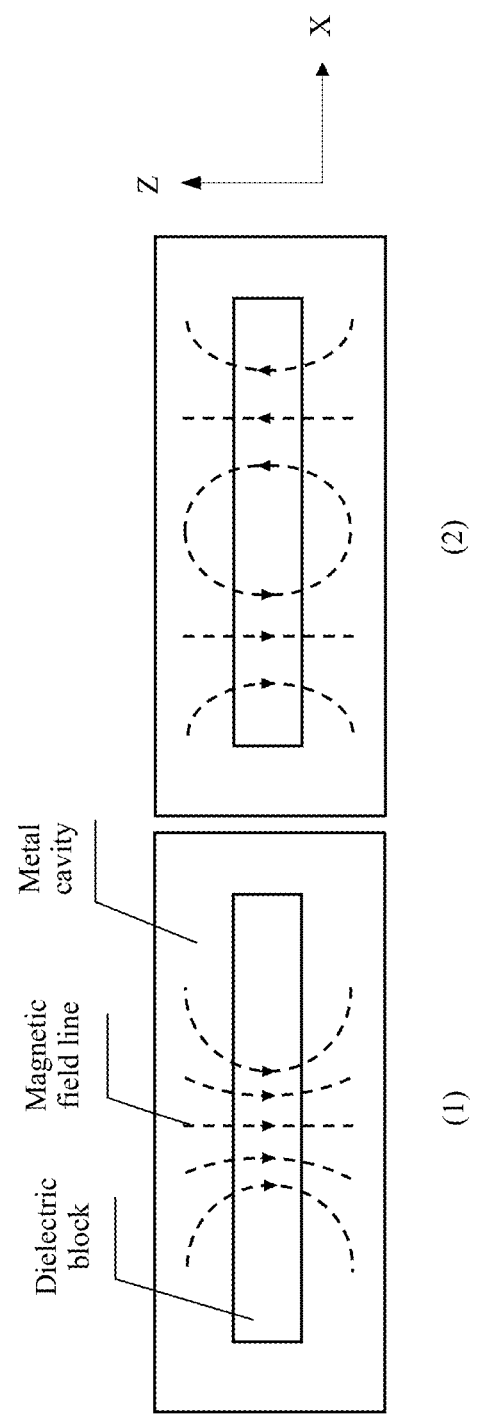
Figure 3:
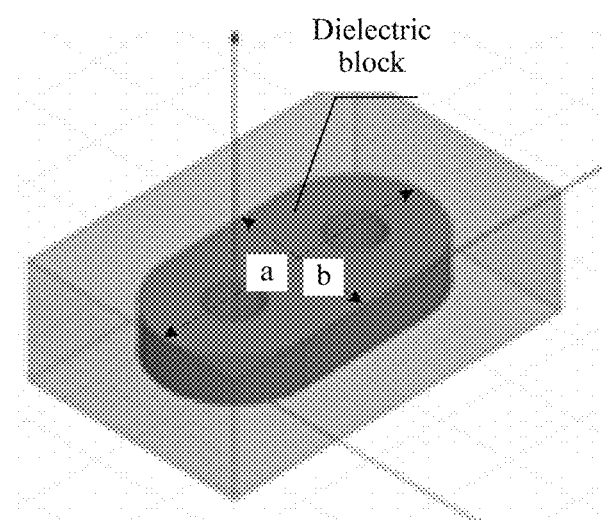
Figure 4:
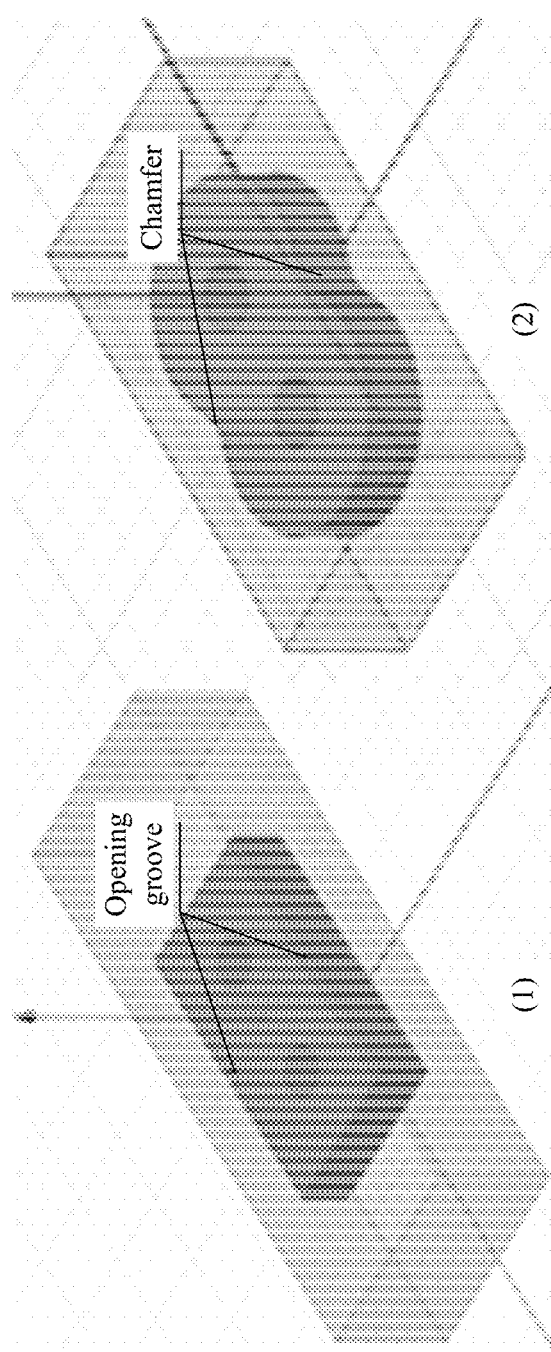
Figure 5:
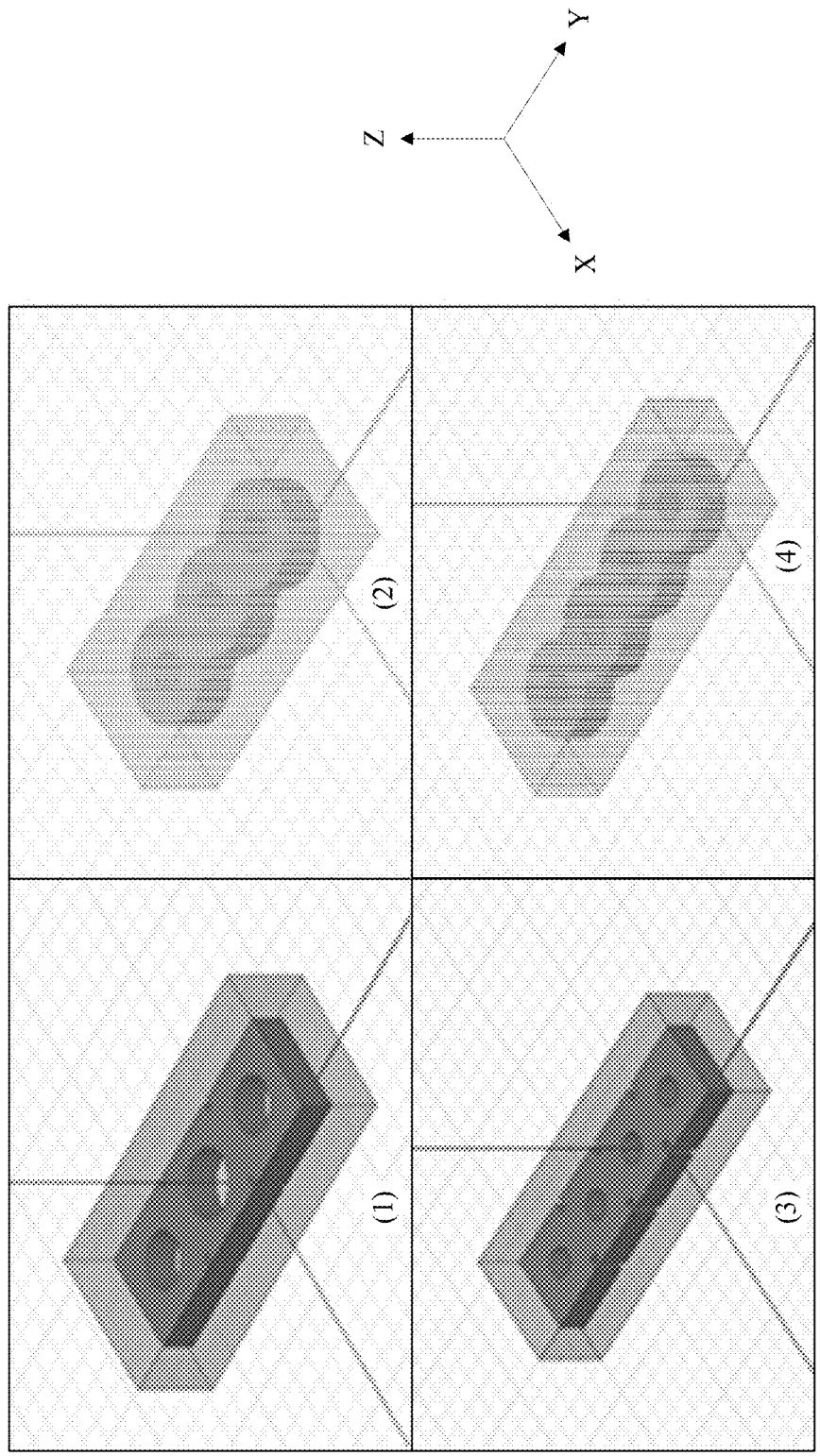
Figure 6:
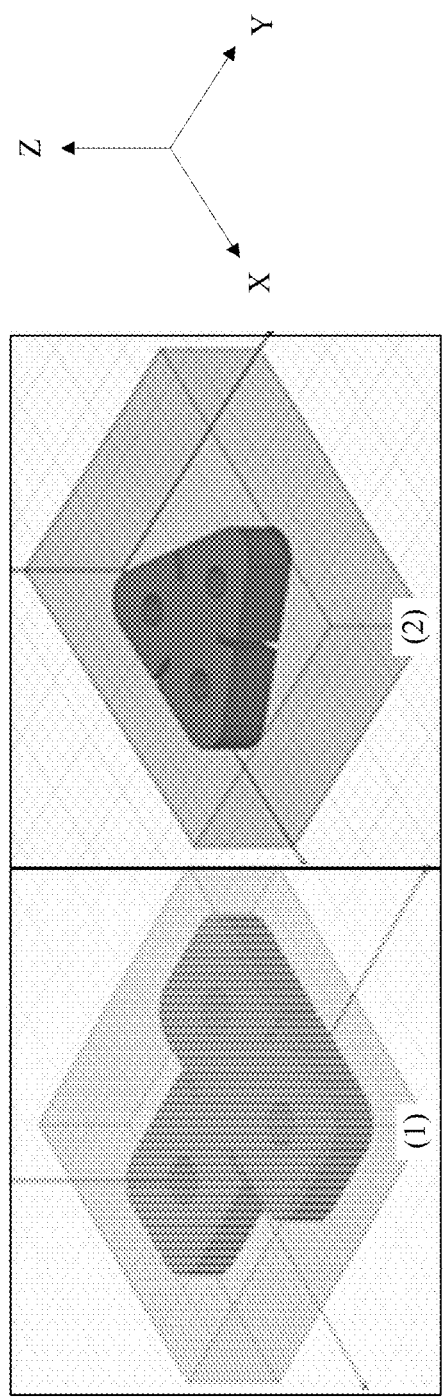
Figure 7:
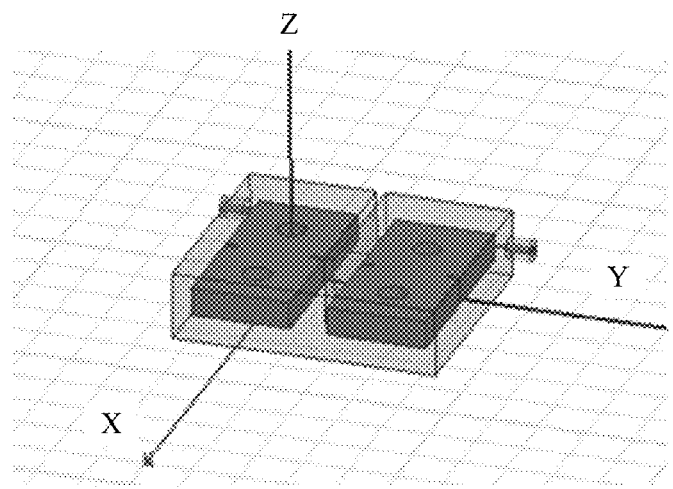
Figure 8:
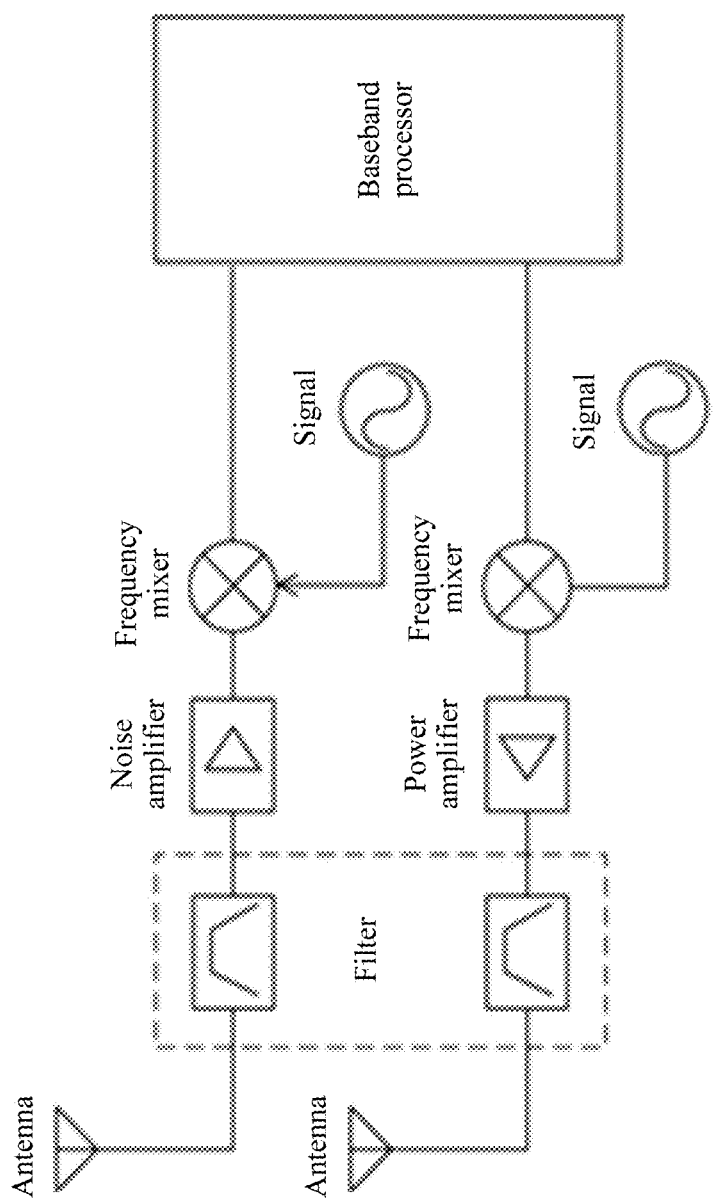

(1) and (2) in FIG. 2a are schematic diagrams of electric field lines of a dielectric resonator in two working resonance modes according to an embodiment of this application;

(1) and (2) in FIG. 2b are schematic diagrams of magnetic field lines of a dielectric resonator in two working resonance modes according to an embodiment of this application;

FIG. 3 is a three-dimensional diagram of another dielectric resonator according to an embodiment of this application;

(1) in FIG. 4 is a three-dimensional diagram of a dielectric resonator including an opening groove according to an embodiment of this application;

(2) in FIG. 4 is a three-dimensional diagram of a dielectric resonator including a chamfer according to an embodiment of this application;

(1) to (4) in FIG. 5 are three-dimensional diagrams of another four possible dielectric resonators according to an embodiment of this application;

(1) and (2) in FIG. 6 are three-dimensional diagrams of two more possible dielectric resonators according to an embodiment of this application;

FIG. 7 is a schematic diagram of a possible dielectric filter according to an embodiment of this application; and FIG. 8 is a possible schematic structural diagram of a base station according to an embodiment of this application.

DESCRIPTION OF EMBODIMENTS

The following clearly describes the technical solutions in the embodiments of the present invention with reference to the accompanying drawings in the embodiments of the present invention.

It should be noted that, in the embodiments of this application, a three-dimensional coordinate system is used to describe features, such as structures and electromagnetic field distribution, of a dielectric resonator and a dielectric filter related to this application. For ease of description and understanding, in the embodiments of this application, a three-dimensional coordinate system in which an X axis and a Y axis are parallel to a horizontal plane, and a Z axis is perpendicular to the horizontal plane is used as an example for description. It may be understood that directions of the X axis, the Y axis, and the Z axis and a corresponding XY plane in the three-dimensional coordinate system may be changed based on a specific device or system requirement in actual application. This is not limited in this application. For example, when both the X axis and the Y axis are parallel to the horizontal plane, the XY plane is parallel to the horizontal plane; or when the X axis is parallel to the horizontal plane and the Y axis is perpendicular to the horizontal plane, the XY plane is parallel to both the X axis and the Y axis and is perpendicular to the horizontal plane.

FIG. 2 is a three-dimensional perspective view of a dielectric resonator according to an embodiment of this application.

The dielectric resonator provided in this embodiment of this application includes a metal cavity 202 and a dielectric block 201 that is disposed in the metal cavity 202 and that is made from a solid-state dielectric material. Sizes of the dielectric block 201 in a three-dimensional coordinate system meet $c<b<a$. As shown in FIG. 2, c is a size (that is, a height) of the dielectric block 201 in a Z axis direction in the three-dimensional coordinate system, and a and b are sizes (that is, a length and a width) of the dielectric block 201 in an X axis direction and a Y axis direction in the three-dimensional coordinate system. A hole 203 is disposed on the dielectric block 201. A plurality of working resonance modes with close frequencies are constructed by drilling the hole on the dielectric. An electric field in the working resonance mode rotates around the small hole used as a center. Electric fields in all the working resonance modes form one or more closed loops in the XY plane of the three-dimensional coordinate system, so as to implement a flattened multimode dielectric resonator and generate, on a same dielectric block, a plurality of working resonance modes with close frequencies, so that a filter passband is generated by using these resonance frequencies. Compared with a conventional single-mode dielectric resonator, a quantity of resonators and an occupied area are reduced. Compared with a conventional multimode dielectric resonator, a thickness of the resonator is reduced, and flattening is implemented. A surface of the dielectric block 201 is not metalized and is not in contact with the metal cavity 202, so that a good quality factor (Q value) of the resonance mode is maintained, so as to facilitate implementing a high-performance filter. In addition, because magnetic fields in different modes of the dielectric resonator are in a same direction, greater convenience is provided to perform single-sided debugging on the dielectric resonator.

In an example, (1) and (2) in FIG. 2a are respectively schematic top views of electric field lines of a dielectric resonator shown in FIG. 2 in two working resonance modes. An electric field in the first working resonance mode corresponding to (1) in FIG. 2a forms one closed loop in a plane. An electric field in the second working resonance mode corresponding to (2) in FIG. 2a forms two closed loops in a plane. The electric fields in the two working resonance modes are in the same plane. For example, both the electric fields in the two working resonance modes are distributed in the XY plane of the three-dimensional coordinate system. In a specific example, a hole may be disposed on the dielectric block, so that a resonance frequency in a working resonance mode corresponding to two or more electric field closed loops formed in the plane and a resonance frequency in a working resonance mode corresponding to one electric field closed loop formed in the plane are within a same passband range, so as to form a filter passband by using resonance frequencies of a plurality of working resonance modes. The electric fields in the plurality of working resonance modes rotate around the small hole used as a center. Electric fields in all the working resonance modes form one or more closed loops in the XY plane of the three-dimensional coordinate system, so as to implement a flattened multimode dielectric resonator and generate a plurality of modes with close frequencies on the same dielectric block, so that a filter passband is generated by using these resonance frequencies. Compared with a conventional single-mode dielectric resonator, a quantity of resonators and an occupied area are reduced. Compared with a conventional multimode dielectric resonator, a thickness of the resonator is reduced, and flattening is implemented. (1) and (2) in FIG. 2b are respectively schematic side views of magnetic field lines of a dielectric resonator shown in FIG. 2 in a first working resonance mode and a second working resonance mode. Because magnetic fields of the dielectric resonator in different working resonance modes are in a same direction, greater convenience is provided to perform single-sided debugging on the dielectric resonator.

In a specific example, as shown in FIG. 2, sizes of the dielectric block 201 with two holes in the three-dimensional coordinate system further meet $b<a\leq 2b$.

In an example, a quantity of holes on the dielectric block 201 is greater than or equal to one. In the example shown in FIG. 2, there are two holes on the dielectric block 201, centers of the holes are on a line of symmetry of the dielectric block 201 that is in the XY plane and that is parallel to the X axis in the three-dimensional coordinate system, and the holes are successively arranged in the X axis direction. The two holes are respectively on two sides of the line of symmetry of the dielectric block 201 that is in the XY plane and that is parallel to the Y axis in the three-dimensional coordinate system. A plurality of holes are drilled on the dielectric block, and one or more factors such as a quantity of holes, a distance between the holes, a size of the hole, and a shape of the hole are adjusted, so that the working resonance mode of the dielectric resonator can work in a required frequency band range, and a non-working resonance mode is kept away from a working frequency band, so as to construct a plurality of working resonance modes with close frequencies in a same plane and further form a filter passband by using these resonance frequencies.

In an example, the dielectric block 201 may be hung in the metal cavity 202 through support of a supporting ledge 204. The supporting ledge 204 is usually made from a material of a relatively low dielectric constant, and may be approximately considered not to participate in resonance. It may be understood that the dielectric block 201 may also be hung in the metal cavity 202 in another installation manner. This is not limited in this application.

In an example, the metal cavity 202 may include a metal box and a cover. It may be understood that the metal cavity 202 may also be implemented in another manner or by using another structure. This is not limited in this application.

In an example, the solid-state dielectric material from which the dielectric block 201 is made may be ceramic. The ceramic has a relatively high quality factor, a relatively high dielectric constant, and relatively good performance in hardness and heat resistance. Therefore, the ceramic becomes a frequently-used solid-state dielectric material in the field of radio-frequency filters. Certainly, the solid-state dielectric material from which the dielectric block 201 is made may also be another material known to a person skilled in the art, for example, glass or a non-conducting macromolecular polymer.

In an example, the resonance frequency of the dielectric resonator may be further adjusted by adjusting one or more parameters such as a shape or a size of the dielectric block 201, a shape or a size of the hole 203, a quantity of holes 203, or a distance between the plurality of holes, so that a working mode of the dielectric resonator includes a resonance frequency corresponding to a fundamental mode, so as to avoid a low-end spurious problem of the dielectric resonator.

It should be noted that the shape of the hole 203 in the dielectric resonator provided in the foregoing embodiment is not limited to a circle shown in FIG. 2, and may also be a square or another shape. In addition, the hole 203 may be disposed as a through hole or a blind hole based on a specific requirement, for example, a requirement of adjusting the resonance frequency of the dielectric resonator. FIG. 2 does not show a perspective structure of the hole. A shape of the dielectric block 201 is not limited to a flat cuboid shown in FIG. 2, and may also be another flat shape. The shape of the dielectric block 201, the shape of the hole 203, the quantity of holes 203, the size of the hole 203, a location of the hole 203, and the distance between the plurality of holes may be selected or adjusted based on an application scenario and a performance parameter requirement of the dielectric resonator. For example, the resonance frequency of the dielectric resonator is adjusted by adjusting one or more of the foregoing parameters. This is not limited in this application.

FIG. 3 is a three-dimensional diagram of another dielectric resonator according to an embodiment of this application.

A specific shape of a dielectric block of the dielectric resonator shown in FIG. 3 is different from the shape of the dielectric block of the dielectric resonator shown in FIG. 2. The shape of the dielectric block of the dielectric resonator shown in FIG. 3 is obtained by performing chamfer processing on two overlapped circles. Another structure and feature are the same as the structure and the feature in the embodiment in FIG. 2, and details are not described herein again.

(1) and (2) in FIG. 4 are three-dimensional diagrams of another two dielectric resonators according to an embodiment of this application.

An opening groove is disposed on a part of a dielectric block of the dielectric resonator shown in (1) in FIG. 4, and a chamfer is disposed on a part of a dielectric block of the dielectric resonator shown in (2) in FIG. 4. Other structures and features of the dielectric resonators shown in (1) and (2) in FIG. 4 are respectively the same as the structures and the features of the dielectric resonators in the embodiments in FIG. 2 and FIG. 3, and details are not described herein again. Compared with a conventional multimode resonator that uses a method of adding an external debugging screw to adjust a bandwidth of coupling (representing strength of coupling between resonance modes), the opening groove and/or the chamfer are or is disposed on some locations of the dielectric blocks, so that the bandwidth of the coupling between different working resonance modes of the dielectric resonator can still be flexibly controlled in small space, and an electric field and a magnetic field in the working mode of the resonator rotate, so as to change an amount of coupling between different modes and further implement a required working bandwidth. It may be understood that locations or a location of the opening groove and/or the chamfer are or is not limited to locations shown in (1) and (2) in FIG. 4, the opening groove and/or the chamfer may further be at another location of the dielectric block to adjust the bandwidth of coupling between different modes, and both the opening groove and the chamfer may also be disposed on a same dielectric block. This is not limited in this application.

(1) to (4) in FIG. 5 are three-dimensional diagrams of another four possible dielectric resonators according to an embodiment of this application.

The another dielectric resonator provided in this embodiment of this application includes a metal cavity and a dielectric block that is disposed in the metal cavity and that is made from a solid-state dielectric material. A size of the dielectric block in one dimension in a three-dimensional coordinate system is less than sizes of the dielectric block in the other two dimensions. A size (that is, a height) of the dielectric block in a Z axis direction in the three-dimensional coordinate system is denoted as c, and a and b are respectively sizes (that is, a length and a width) of the dielectric block in an X axis direction and a Y axis direction in the three-dimensional coordinate system. Sizes of the dielectric blocks of the dielectric resonators shown in (1) to (4) in FIG. 5 meet c<b<a. A hole is disposed on the dielectric block. Specifically, each of dielectric blocks of dielectric resonators shown in (1) and (2) in FIG. 5 includes three holes, and each of dielectric blocks of dielectric resonators shown in (3) and (4) in FIG. 5 includes four holes. A surface of the dielectric block is not metalized and is not in contact with the metal cavity.

In a specific example, sizes of the dielectric blocks that are shown in (1) and (2) in FIG. 5, that include three holes, and that are of the dielectric resonators further meet b<a≤3b. Sizes of the dielectric blocks that are shown in (3) and (4) in FIG. 5, that include four holes, and that are of the dielectric resonators further meet b<a≤4b.

In a specific example, centers of a plurality of holes are on a line of symmetry that is of the dielectric block, that is in an XY plane, and that is parallel to the X axis in the three-dimensional coordinate system, and the holes are successively arranged in the X axis direction.

In a specific example, each of the dielectric blocks of the dielectric resonators shown in (1) and (3) in FIG. 5 further includes an opening groove, and each of the dielectric blocks of the dielectric resonators shown in (2) and (4) in FIG. 5 further includes a chamfer.

In an example, the dielectric block may be hung in the metal cavity through support of a supporting ledge. The supporting ledge is usually made from a material of a relatively low dielectric constant, and may be approximately considered not to participate in resonance. It may be understood that the dielectric block may also be hung in the metal cavity in another installation manner. This is not limited in this application.

In an example, the solid-state dielectric material from which the dielectric block is made may be ceramic. The ceramic has a relatively high quality factor, a relatively high dielectric constant, and relatively good performance in hardness and heat resistance. Therefore, the ceramic becomes a frequently-used solid-state dielectric material in the field of radio-frequency filters. Certainly, the solid-state dielectric material from which the dielectric block is made may also be another material known to a person skilled in the art, for example, glass or a non-conducting macromolecular polymer.

In an example, the resonance frequency of the dielectric resonator may be further adjusted by adjusting one or more parameters such as a shape or a size of the dielectric block, a shape or a size of a hole, a quantity of holes, or a distance between the plurality of holes, so that a working resonance mode of the dielectric resonator includes a resonance frequency corresponding to a fundamental mode, so as to avoid a low-end spurious problem of the dielectric resonator.

It should be noted that the shape of the hole in the dielectric resonator provided in the foregoing embodiment is not limited to a circle shown in (1) to (4) in FIG. 5, and may also be a square or another shape. In addition, the hole may be a through hole or a blind hole. A shape of the dielectric block is not limited to a shape shown in (1) to (4) in FIG. 5, and may also be another flat shape. The shape of the dielectric block, the shape of the hole, the quantity of holes, the size of the hole, a location of the hole, and the distance between the plurality of holes may be selected or adjusted based on an application scenario and a performance parameter requirement of the dielectric resonator. This is not limited in this application.

(1) and (2) in FIG. 6 are three-dimensional diagrams of two more possible dielectric resonators according to an embodiment of this application.

Based on the dielectric resonator in the embodiment in (1) in FIG. 5, the dielectric resonators shown in (1) and (2) in FIG. 6 are formed after transformation and processing are performed on the dielectric resonator, and a main difference between the dielectric resonator and the dielectric resonator in the embodiment in (1) in FIG. 5 is that a shape of a dielectric block is an irregular flat shape. The dielectric block is transformed, so as to implement a more compact layout and flexibly select a form based on different use scenarios. For a dielectric resonator with three or more modes, cross coupling may be further adjusted by transforming a structure. For example, the dielectric resonator shown in (1) in FIG. 5 is usually configured to implement coupling between a working resonance mode 1 and a working resonance mode 2 and coupling between the working resonance mode 2 and a working resonance mode 3. In addition, the dielectric resonators shown in (1) and (2) in FIG. 6 can implement and adjust coupling between the working resonance mode 1 and the working resonance mode 3 through transformation, so as to implement performance required by the dielectric filter. Compared with a conventional multimode dielectric resonator that implements a limited coupling bandwidth range and that has difficulty in implementing cross coupling, the embodiment of the dielectric resonators shown in (1) and (2) in FIG. 6 is more conducive to implementation of multimode cross coupling.

FIG. 7 is a schematic diagram of a possible dielectric filter according to an embodiment of this application.

In an example, the dielectric filter provided in this embodiment of this application includes any one of the foregoing dielectric resonators.

In another example, the dielectric filter provided in this embodiment of this application includes any two or more of the foregoing dielectric resonators, and compared with a filter including a conventional multimode resonator, the dielectric filter is more applicable to a flattening scenario of a filter or a base station. Specifically, FIG. 7 is a schematic diagram of a dielectric filter formed by cascading dielectric resonators according to an embodiment of this application. Electric fields in all working resonance modes of two dielectric resonators in FIG. 7 are distributed in an XY plane of a three-dimensional coordinate system, and the dielectric filter is formed through spatial coupling and cascading. After being cascaded, the dielectric resonators still maintain a feature that the electric fields in the working resonance modes are distributed in a same plane (for example, the XY plane), so that the entire filter is thinned in a Z axis direction. It may be understood that the two or more of the foregoing dielectric resonators used for cascading may be the same or different. In this application, the dielectric resonator may also be cascaded with another dielectric resonator and/or a resonator with a metal cavity based on a specific requirement. This is not limited in this application.

An embodiment of the present invention further provides a transceiver, including any one or more types of the dielectric filters described in the foregoing embodiments. Because the dielectric filter provided in the embodiment of the present invention is applied, the transceiver is more applicable to a miniaturized and flattened application scenario.

An embodiment of the present invention further provides a base station, including the dielectric filter or the transceiver described in the foregoing embodiment. Because the dielectric filter provided in the embodiment of the present invention is applied, the base station is more applicable to a miniaturized and flattened application scenario.

It should be noted that the base station (BS) mentioned in this application refers to an apparatus for performing direct communication with user equipment by using a wireless channel, and the base station may include a macro base station, a micro base station, a relay station, an access point, a remote radio unit (RRU), and the like with various forms. In systems using different radio access technologies, names of devices having a base station function may vary. For example, in an LTE network, the device having a base station function is referred to as an evolved NodeB (eNB or eNodeB), and the device having a base station function is referred to as a NodeB or the like in a 3rd Generation (3G) network. For ease of description, in this application, the foregoing apparatuses for performing direct communication with the user equipment by using the wireless channel are collectively referred to as base stations.

FIG. 8 is a possible schematic structural diagram of a base station according to an embodiment of this application. A filter shown in the figure is any one or more types of the dielectric filters provided in the embodiments of this application, and the dielectric filter includes any one or more types of the dielectric resonators provided in the embodiments of this application. In an uplink direction, a signal is received by an antenna, then the signal is transformed to a baseband after being processed by the filter, a noise amplifier, and a frequency mixer, and the signal is sent to a baseband processor for processing. In a downlink direction, a baseband signal processed by the baseband processor is transformed to a radio frequency after being processed by the frequency mixer, a power amplifier, and the filter, and is sent by using the antenna. It may be understood that the structure of the base station shown in FIG. 8 is only used as an example to describe basic composition of the base station. In actual, the base station may further include any quantity of the foregoing structures or apparatuses, or may include another structure or apparatus based on a function of the base station. This is not limited in this application.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A dielectric resonator, comprising a metal cavity and a dielectric block that is disposed in the metal cavity and that is made from a solid-state dielectric material; wherein sizes of the dielectric block meet $c<b<a$, wherein a, b, and c are respectively the sizes of the dielectric block in three dimensions in a three-dimensional coordinate system;

a plurality of holes disposed on the dielectric block symmetrically on a central line along a length of the dielectric block, wherein a single electric field forms a closed loop around all of the plurality of holes in a first resonance mode, and two or more electric fields form a closed loop around each of the plurality of holes in a second resonance mode; and a surface of the dielectric block is not metalized and is not in contact with the metal cavity.

2. The dielectric resonator according to claim 1, wherein the holes are a through hole or a blind hole.

3. The dielectric resonator according to claim 1, wherein a chamfer and/or an opening groove are or is further disposed on the dielectric block.

4. A dielectric filter, comprising a dielectric resonator, wherein the dielectric resonator comprising:

a metal cavity and a dielectric block that is disposed in the metal cavity and that is made from a solid-state dielectric material; wherein sizes of the dielectric block meet $c<b<a$, wherein a, b, and c are respectively the sizes of the dielectric block in three dimensions in a three-dimensional coordinate system;

a plurality of holes disposed on the dielectric block symmetrically on a central line along a length of the dielectric block, wherein a single electric field forms a closed loop around all of the plurality of holes in a first resonance mode, and two or more electric fields form a closed loop around each of the plurality of holes in a second resonance mode; and a surface of the dielectric block is not metalized and is not in contact with the metal cavity.

5. The dielectric filter according to claim 4, wherein the holes are a through hole or a blind hole.

6. The dielectric filter according to claim 4, wherein a chamfer and/or an opening groove are or is further disposed on the dielectric block.

7. A transceiver, comprising a dielectric resonator, wherein the dielectric resonator comprising:

a metal cavity and a dielectric block that is disposed in the metal cavity and that is made from a solid-state dielectric material; wherein sizes of the dielectric block meet $c<b<a$, wherein a, b, and c are respectively the sizes of the dielectric block in three dimensions in a three-dimensional coordinate system;

a plurality of holes disposed on the dielectric block symmetrically on a central line along a length of the dielectric block, wherein a single electric field forms a closed loop around all of the plurality of holes in a first resonance mode, and two or more electric fields form a closed loop around each of the plurality of holes in a second resonance mode; and a surface of the dielectric block is not metalized and is not in contact with the metal cavity.

8. The transceiver according to claim 7, wherein the holes are a through hole or a blind hole.

9. The transceiver according to claim 7, wherein a chamfer and/or an opening groove are or is further disposed on the dielectric block.

* * * * *